Figure 1:
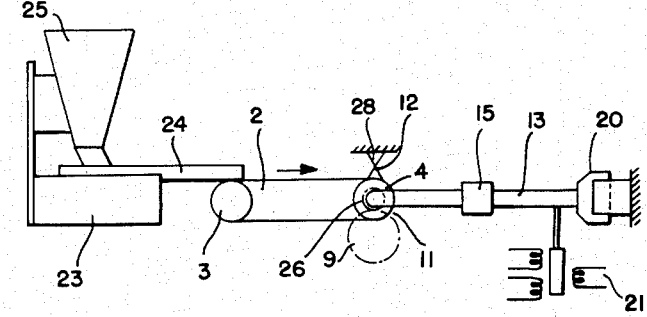

INVENTORS:
ERNST EBERHARDT
HANS GEORG SPECHT

United States Patent Office
3,190,381
Patented June 22, 1965

3,190,381
WIDE-RANGE CONVEYOR-TYPE BATCH WEIGHER
Ernst Eberhardt and Hansgeorg Specht, Ludwigshafen (Rhine), Germany, assignors to Badische Anilin- & Soda-Fabrik Aktiengesellschaft, Ludwigshafen (Rhine), Germany
Filed May 6, 1963, Ser. No. 278,368
Claims priority, application Germany, May 5, 1962, B 67,131
6 Claims. (Cl. 177—120)

This invention relates to a belt weigher for bulk goods and more particularly to a conveyor-type belt weigher which may be used over a wide range and which also operates reliably and accurately with a small conveying capacity.

Dumping weighers may be used in chemical and related plants for dosing constant amounts of bulk goods over long periods of time. In these dumping weighers, equal amounts of the bulk goods are weighed out at equal intervals of time, tipped out and supplied to the plant. If a uniform supply of material to the plant is required, the batchwise stream of material must be converted into a uniform stream by means of vibrating chutes or mixers. The disadvantage of such dosing is that a uniform output cannot be achieved in a short space of time. Difficulties are therefore encountered in processes which are sensitive to a fluctuating supply.

Another disadvantage of the prior art weighers is their liability to become soiled and this makes it difficult or even impossible to carry out dosing of powdered bulk goods or bulk goods tending to acquire electrostatic charge; a further disadvanatge is the use of mechanically moved parts and contacts which are susceptible to wear and soiling.

A small conveyor type batch weigher is known which can be used over the range 0.2 to 4 kg. per hour and which exhibits the said disadvantages. A further disadvantage of this weigher is its relatively great weight occasioned mainly by the associated switching mechanism which is of very complicated construction.

A primary object of this invention is to provide a conveyor type batch weigher which has a low intrinsic weight and which permits rapid and accurate regulation of the bulk goods being dosed.

Another object of the invention is to provide a conveyor type batch weigher by means of which bulk goods can be dosed within a wide range.

A further object of the invention is to provide a conveyor type batch weigher which is so constructed that it operates constantly with high weighing accuracy and is not damaged or disturbed by dusty bulk goods.

A still further object of the invention is to provide apparatus for controlling the amount of material being dosed by means of a short term impulse originating from the weigher.

According to the invention a belt type batch weigher for bulk goods comprises an endless belt passing over an outer guide roller and a cylindrical inner driving roller, said rollers being mounted in bearings in a frame, a motor attached to the frame and arranged beneath the driving roller for driving the latter, said belt, frame rollers and motors forming the first arm of a balance, a sliding weight beam with at least one sliding weight forming the second arm of the balance and attached to the frame in Z-shaped arrangement, a central cross band axis between the frame and the sliding weight beam for oscillating suspension of the frame and the motor associated therewith and also the sliding weight beam in the neighborhood of the discharge zone of the belt, lateral guide plates over the lower flight of the belt, a trough beneath the upper flight of the belt, a differential transformer for frictionless scanning of the deflection of the sliding weight beam, an eddy current brake for damping oscillations of the sliding weight beam and a regulator controlled by the differential transformer and having an indicating means for control of a feeder ending over the outer guide roller and supplying the bulk goods to be weighed.

The pivoting axis of the balance is constituted by cross bands instead of knife edges and sockets because such cross bands are not liable to become soiled and are free from friction.

Preferably the upper flight of the belt has a troughlike cross-section inparted to it. This, together with the fact that the lower flight of the belt is protected against falling material by said guide plates makes it safe to heap up the material fairly high on the belt.

Preferably, a variable drive is provided between the motor and the driving roller so that, for example, three different constant belt speeds may be chosen.

Advantageously said regulator is an electronic proportional integral (PI) controller the output current of which controls said feeder.

Very favourable regulating properties result by choosing a high restoring moment of the balance with the smallest possible moment of inertia, so that the period of oscillation of the balance can be kept as short as possible. In this way, not only low belt speeds, but also relatively high belt speeds are permissible and this makes possible the use of the weigher over a wide range.

The low mechanical sensitivity occasioned by the high restoring moment is compensated for by the high degree of amplification of the electronic regulator.

Since the balance arms make only very small movements, it is advantageous for the deviations of the balance from the zero position to be indicated by a sensitive electrical measuring instrument connected to the amplifier.

The Z-shaped construction of the balance makes it possible to separate the conveyor belt by a partition from the remaining oscillating portions of the balance, which may be covered by means of a transparent plastic hood. In the case of dusty materials, soiling of the parts of the balance required for weight determination and a constantly increasing displacement of the zero point are thus prevented.

Additionally it is possible to blow compressed air into the space enclosed by the hood. A more reliable exclusion of dust is thus achieved.

Figure 2:
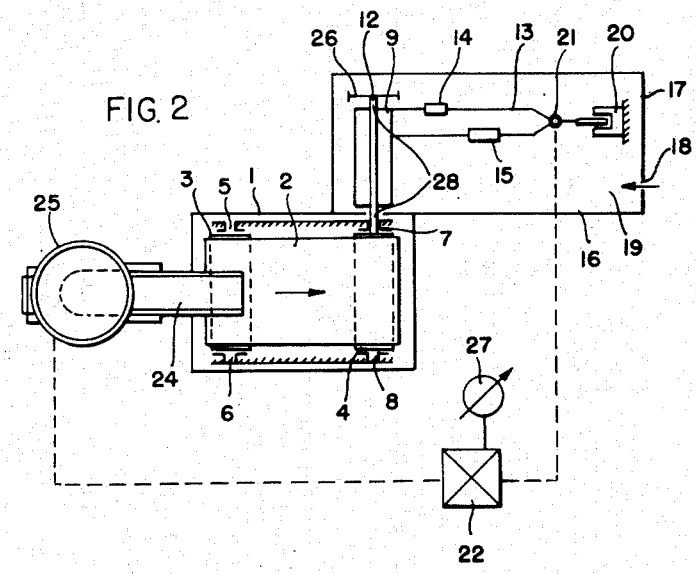
Figure 3:
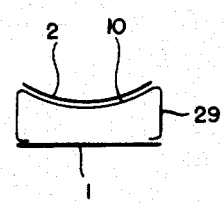

An embodiment of a belt type batch weighing apparatus according to the invention is shown, by way of example, in the accompanying drawing, in which FIGURE 1 is a diagrammatic side elevation of the apparatus, FIGURE 2 is a plan of the apparatus, and FIGURE 3 is a section through the belt and weighbridge of the apparatus.

The weighing apparatus illustrated comprises a conveyor belt 2 provided between an outer guide roller 3 and an inner cylindrical driving roller 4, these rollers being mounted in a frame 1 and the roller 4 being driven by a motor 9. The guide roller 3 is mounted in bearings 5 and 6, and the driving roller 4 is mounted in bearings 7 and 8. The upper flight of the conveyor belt 2 runs over a trough 10 which also makes lateral wandering of the belt difficult. By conforming to the shape of trough 10 the conveyor belt is also able to receive a greater depth of material than would be possible otherwise. The lower flight of the belt 2 is covered by a guide plate 29.

The conveyor belt 2 is arranged to pivot in a known manner about an axis 12, the extension of which passes near to the discharge zone 11. This imparts favourable regulation properties to the balance. All the parts which oscillate about the pivoting axis 12 are made as light as possible so as to achieve a short period of oscillation and to increase the speed of regulation.

As a counterweight for the belt and its associated holding parts which oscillate about the pivoting axis 12 there is provided a sliding weight beam 13 on the other side of the pivoting axis 12, the beam 13 being provided with sliding weights 14 and 15. The oscillating system of the balance accordingly consists of the belt 2, the motor 9, and the sliding weight beam 13, and is Z-shaped in plan. It is therefore possible to separate the belt 2 from the remaining parts of the balance by a partition 16. These remaining parts of the balance are enclosed by walls 17 and thus protected against dust. The partition 16 and the walls 17 form a chamber 19 into which compressed air may be blown through an opening 18.

Since at least one bearing of the pivoting axis 12 is exposed to the danger of dust, it does not consist, as in the case of conventional balances, of a socket and knife edge but of a frictionless cross band suspension 28 which is insensitive to dust and which is already known in the construction of instruments. Damping of the oscillations of the balance is effected by a known eddy current damping means 20. Deflection of the balance is scanned in frictionless manner by a differential transformer 21. A feeder 23 is moved proportionally and integrally through an electronic regulator 22. The feeder may be for example a vibrating chute 24 arranged beneath a container 25.

The electronic regulator 22 is a proportional integral regulator. Since a very high electrical amplification is selected, a low mechanical sensitivity of the balance is sufficient. This means that the restoring force of the Z-shaped balance may be kept high and consequently the period of oscillation of the balance may be kept short. The consequence of this is a rapidly acting control which permits both low and high belt speeds. This is achieved by providing between the motor 9 and the cylindrical driving roller 4 a variable drive 26 comprising three gears providing two gear reductions each having a 1:5 reduction ratio. Since the carrying capacity of the belt 2 may be varied in the ratio 1:10, for example between 10 g. and 100 g., there results a total range of 1:250, i.e. the amount to be dosed per hour may be varied between 0.2 kg. and 50 kg. The rated value is adjusted by the two sliding weights (14 being for fine adjustment and 15 for coarse adjustment), the masses of the two weights being in the ratio 1:10.

The alternating voltage displaced in phase by 180° above and below the equilibrium position and emanating from the differential transformer 21 is amplified in a two-stage pre-amplifier. The proportional component of the control is obtained by regulating the power amplifier so that the change in current in the feed member is proportional to the deviation of the balance. The proportional range is continuously variable. The output voltage of the pre-amplifier at the same time preferably controls a servomotor which is connected with a control resistance through a slip coupling. The resistance together with the vibration chute 24 is in the output circuit of the power amplifier and forms an integral constituent of the control system. The control is accordingly effected directly by regulation of the quantity of material flowing in the vibration chute 24. The arrangement and connections for the control system here described are not shown in the drawing.

By reason of the above described low mechanical sensitivity of the balance, deviation from the zero position is only adequately indicated by a mechanical indicator at the weighbeam when the deflections are large. Accordingly there is provided, after the pre-amplifier and a following phase-dependent rectification, an electrical instrument 27 which indicates the deviation from zero more sensitively.

We claim:
1. A belt type batch weighing apparatus for bulk goods comprising an endless belt passing over an outer guide roller and a cylindrical inner driving roller, said rollers being mounted in bearings in a frame, a motor attached to the frame and arranged beneath the driving roller for driving the latter, said belt, frame rollers and motor forming the first arm of a balance, a sliding weight beam with at least one sliding weight forming the second arm of the balance and attached to the frame in Z-shaped arrangement, a central cross band axis between the frame and the sliding weight beam for oscillating suspension of the frame and the motor associated therewith and also the sliding weight beam in the neighbourhood of the discharge zone of the belt, lateral guide plates over the lower flight of the belt, a trough beneath the upper flight of the belt, a differential transformer for frictionless scanning of the deflection of the sliding weight beam, an eddy current brake for damping oscillations of the sliding weight beam and a regulator controlled by the differential transformer and having an indicating means for control of a feeder ending over the outer guide roller and supplying the bulk goods to be weighed.

2. A weighing apparatus as claimed in claim 1, wherein an electronic proportional integral controller operating as an amplifier and being dependent on the balance is provided as the regulator for the control of the feeder.

3. A weighing apparatus as claimed in claim 1, wherein the period of oscillation of the Z-shaped weighing balance is kept short by a high restoring moment.

4. A weighing apparatus as claimed in claim 3, wherein the low mechanical sensitivity occasioned by a high restoring moment is compensated for by the high degree of amplification of the proportional integral control system.

5. A weighing apparatus as claimed in claim 1, wherein the deviation of the balance from the zero position is indicated by an electrical measuring instrument connected with the amplifier.

6. A belt type weighing apparatus for bulk goods comprising an endless belt with upper and lower flights, said belt being mounted on an outer guide roller and an inner drive roller, said rollers being journalled on a frame, power drive means for rotatably driving said drive roller and thereby moving said belt, the aforementioned components forming a first arm of balance, adjustable counterbalance means disposed laterally of said first arm and forming a second arm of said balance, means forming a pivot axis for said arms, said pivot axis being in the vicinity of the discharge zone of said belt, means forming a trough in the upper flight of said belt, a differential transformer for frictionless scanning of the deflection of the second arm, means for damping oscillations of the second arm and a regulator controlled by the differential transformer and having an indicating means for control of a feeder ending over the outer guide roller and supplying the bulk goods to be weighed to the upper flight of said belt.

References Cited by the Examiner

UNITED STATES PATENTS

| 849,418 | 4/07 | Nickerson | 177—246 |
|---|---|---|---|
| 1,717,564 | 6/29 | Ihlefeldt | 177—119 X |
| 2,371,040 | 3/45 | Fisher et al. | 177—119 X |
| 2,618,406 | 11/52 | Kast | 198—39 |
| 2,630,007 | 3/53 | Howe et al. | 177—210 X |
| 3,036,769 | 5/62 | Goslin et al. | 198—39 |

FOREIGN PATENTS

| 436,658 | 10/35 | Great Britain. |
|---|---|---|

LEO SMILOW, *Primary Examiner.*